Jan. 9, 1945.  W. F. BOLDT  2,366,696
FLUID PRESSURE ACTUATING SYSTEM
Filed Jan. 7, 1943  3 Sheets-Sheet 1
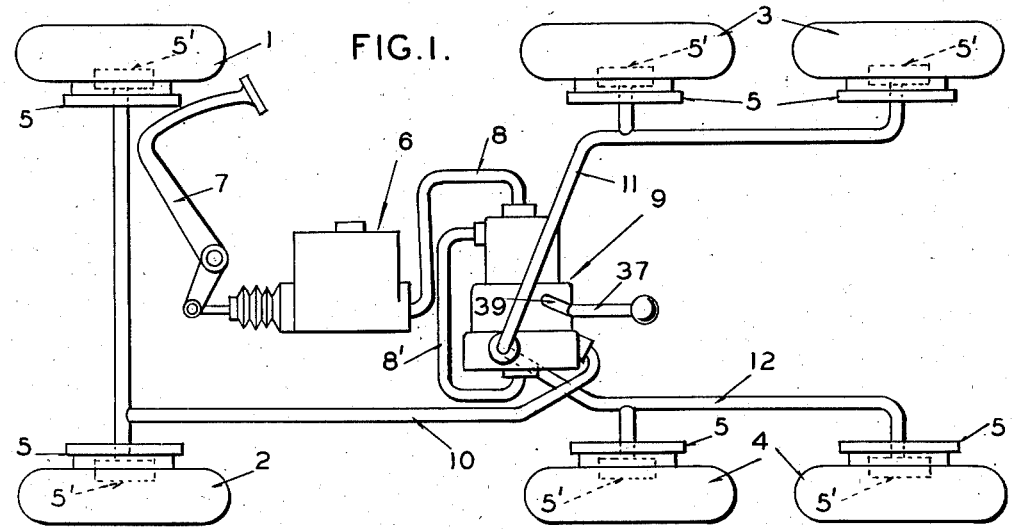
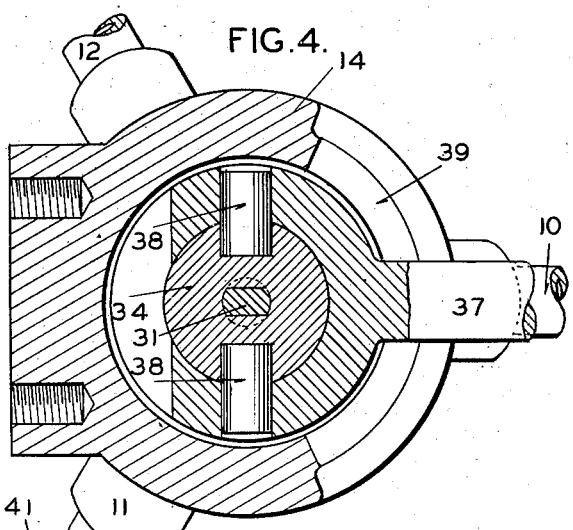
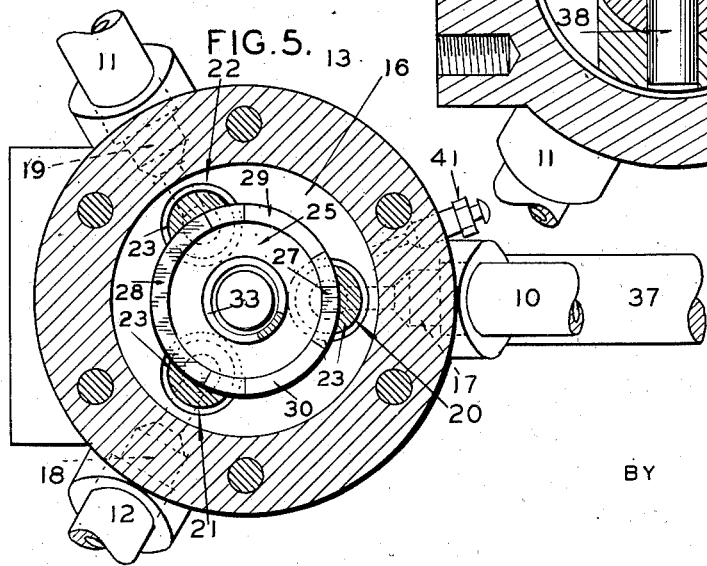
INVENTOR
W. F. BOLDT
BY
ATTORNEY Jan. 9, 1945. W. F. BOLDT 2,366,696
FLUID PRESSURE ACTUATING SYSTEM
Filed Jan. 7, 1943 3 Sheets-Sheet 2

INVENTOR
W.F. BOLDT

BY
ATTORNEY

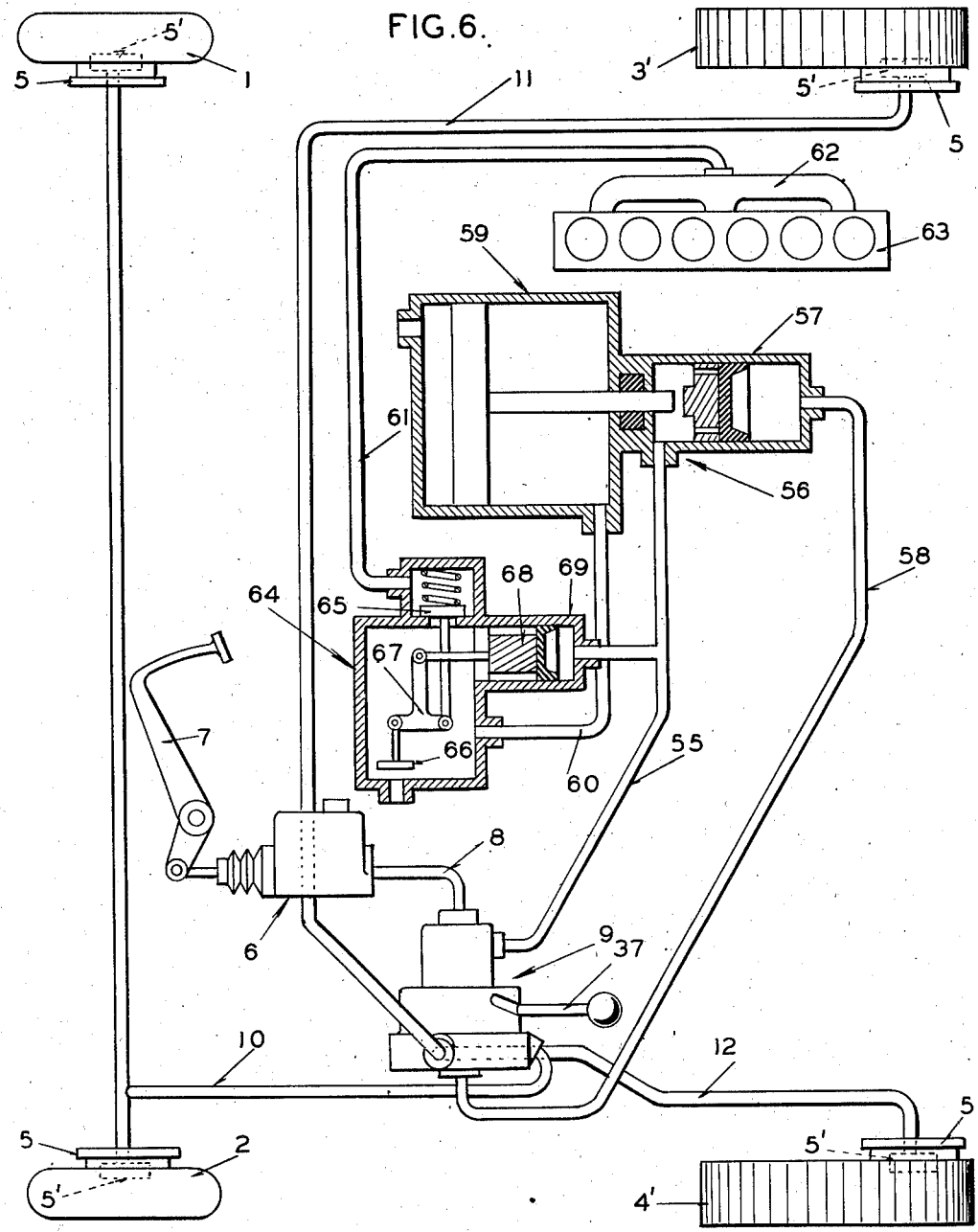

Patented Jan. 9, 1945

2,366,696

UNITED STATES PATENT OFFICE 2,366,696

FLUID PRESSURE ACTUATING SYSTEM

Werner F. Boldt, Clayton, Mo., assignor to Wagner Electric Corporation, St. Louis, Mo., a corporation of Delaware Application January 7, 1943, Serial No. 471,551

20 Claims. (Cl. 188—152)

My invention relates to actuating systems and more particularly to a hydraulic actuating system which may, if desired, have an air pressure system associated therewith.

One of the objects of my invention is to produce a hydraulic actuating system for a plurality of devices which can be controlled by separately operated pressure producing devices.

Another object of my invention is to combine a selector control valve with one of said pressure producing devices and to provide a single manual member for operating the device and valve in a desired sequence or only the device.

Another and more specific object of my invention is to produce an improved hydraulic brake actuating system for a vehicle which can be so controlled that certain brakes can be operated to assist in steering the vehicle.

Figure 3:
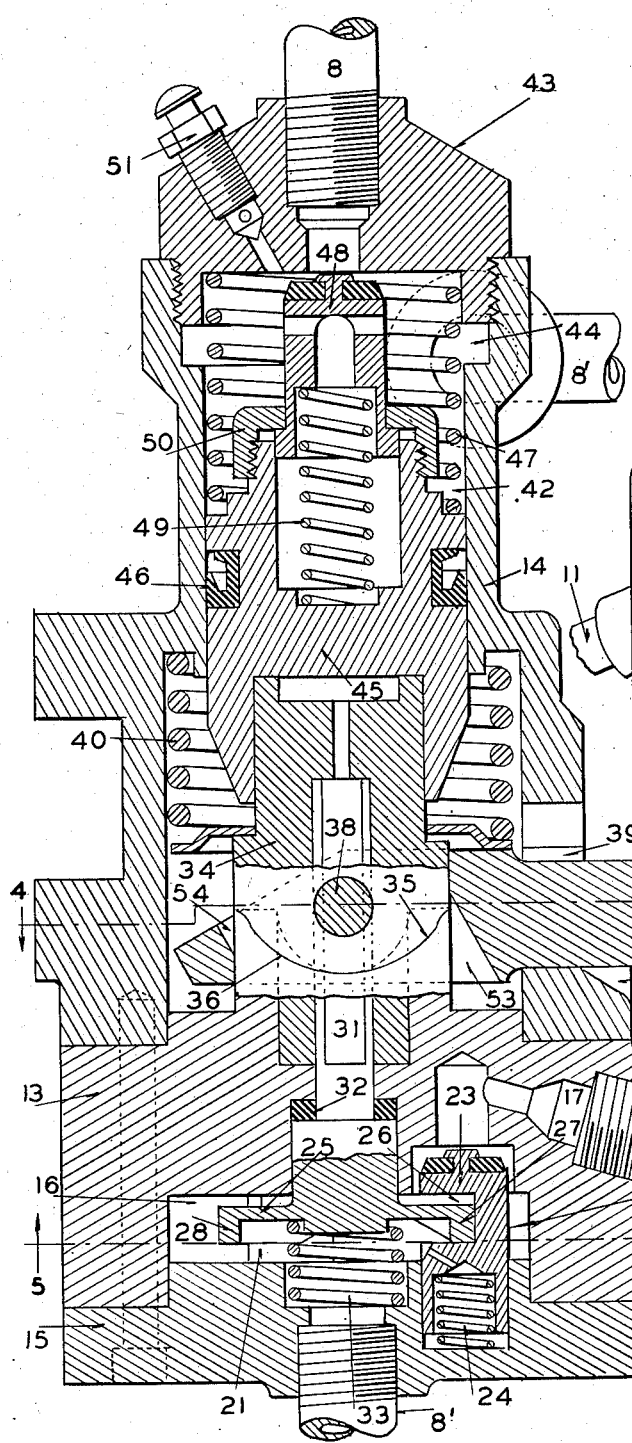
Figure 2:
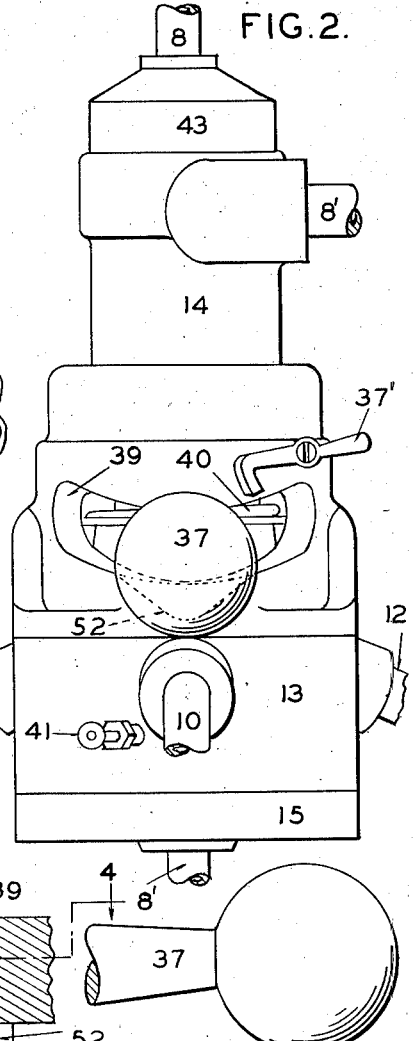

Other objects of my invention will become apparent from the following description taken in connection with the accompanying drawings in which Figure 1 is a schematic view of a hydraulic brake actuating system for a vehicle having my invention embodied therein; Figure 2 is a front view of the combined pressure producing device and selector valve; Figure 3 is a longitudinal sectional view through said combined device and valve; Figures 4 and 5 are sectional views taken on the lines 4—4 and 5—5, respectively, of Figure 3; and Figure 6 is a schematic view of another brake actuating system in which my invention is embodied.

Referring to the drawings in detail, my invention is shown embodied in a hydraulic actuating system for the brakes of a motor vehicle but such is by way of example only as it can be embodied in any fluid system where the results obtained are desirable. In Figure 1 the dirigible front wheels 1 and 2 of said vehicle, the right rear driving wheels 3, and the left rear driving wheels 4 are schematically shown. All of these wheels are provided with brake assemblies 5 which are actuated by fluid motors 5'. The fluid medium employed to control the brakes is a liquid and the source of pressure comprises the well-known master cylinder device 6 operated by a pedal 7. The outlet of the master cylinder is connected by a conduit 8 with my novel combined master cylinder and selector valve mechanism generally indicated by the numeral 9. A conduit 10 leads from this combined mechanism to the fluid motors on the two front wheels to operate the brake assemblies thereof. There is also a conduit 11 which leads to the fluid motors of the brakes on the right rear wheels and a conduit 12 which leads to the fluid motors of the brakes on the left rear wheels. A conduit 8' is associated with the mechanism to connect one port thereof to another port, the reason therefor to be described later.

As shown in detail in Figures 2, 3, 4, and 5, the combined master cylinder and control valve mechanism 9 comprises a main body member 13 to which is fitted a casing member 14 and a bottom plate member 15. The body member and plate member are so formed as to provide a chamber 16 therebetween to which is connected conduit 8' for conducting fluid under pressure from either of the two master cylinders. This chamber 16 has three outlet passages 17, 18, and 19 (see Figure 5) arranged 120 degrees apart in the body member 13. The outlet passage 17 is connected with conduit 10 leading to the front brakes and passages 18 and 19 are connected to conduits 12 and 11, respectively, leading to the rear brakes. Passages 17, 18, and 19 have shut-off valves 20, 21, and 22, respectively, associated therewith.

As best shown in Figure 3, each of these valves comprises a plunger 23 slidably mounted in the bottom plate 15. The plungers are spaced 180 degrees apart with their axes parallel with the vertical axis of the body member. A spring 24 biases each plunger toward seated or closed position. The valves are controlled by a rotatable disc cam 25 mounted in the body member 13 with its peripheral portion being received in cross notches 26 in the valve plungers so that the cam surfaces which are formed as flanges on the disc may cause the plungers to be reciprocated. As best shown in Figures 3 and 5, the disc cam has a short high portion 27 for cooperation with the plunger of valve 20 and a long high portion 28 extending over approximately 120 degrees for cooperation with the plungers of valves 21 and 22. Between the high portions 27 and 28 are low portions 29 and 30.

When the disc is in its normally inoperative position, as shown in the figures, the high portions thereof will be so positioned that all the plungers of the valves will be held in unseated position. If the disc should be turned in a clockwise direction, as viewed in Figure 5, the plungers of valves 20 and 21 will be moved to valve closed position by the action of springs 24 due to the fact that the low portions 29 and 30 of the cam are moved into the slots of the plungers. If the disc should be moved in a counter-clockwise direction, then the plungers of valves 20 and 22 will be moved to closed positions by their springs due to the fact that the low portions 29 and 30 are moved into the slots of said plungers.

The disc is provided with a stem 31 which extends through the body member 13 into casing 14 and in order to seal this stem, there is provided a sealing washer 32 which is compressed by a spring 33 acting on the disc and positioned between said disc and the bottom plate. The inner end of the stem has a rectangular cross-section and is received in a rectangular opening in a member 34. This member is journaled for both rotative and axial movement. The end of member 34 adjacent the body member 13 is formed with a cam surface 35 for cooperation with a complementary cam surface 36 carried by the body member 13 (see Figure 3). The member 34 is adapted to be turned by a lever or handle 37 which is pivoted to said member by pins 38 (Figure 4), said handle projecting through a slot 39 in the wall of the casing member 14 in order to be accessible from the exterior. A spring 40 positioned in the casing member acts on member 34 to hold the cooperating cam surfaces 35 and 36 in engagement with each other and also to bias the handle into engagement with the lower edge of the slot through which it extends.

When the handle is in the central part of the slot, cam surfaces 35 and 36 on member 34 and body member 13 will be in complementary engagement and disc 25 will have the position shown in Figure 5 wherein all the shut-off valves are in open position. If the handle should be moved to the right, as viewed in Figure 2, member 34 will be rotated and also disc 25. This will position the disc so that valves 20 and 21 become closed, valve 22 remaining open. The cam surfaces 35 and 36 will cause member 34 to move upwardly and compress spring 40. If, after moving the handle to the right, the operator should release said handle, spring 40 acting through cam surfaces 35 and 36 will return the handle to its central position. The disc now returns to the position wherein all the shut-off valves will again be held open. If the lever should be turned to the left, as viewed in Figure 2, the disc will be so rotated that the shut-off valves 20 and 22 will be permitted to become closed, shut-off valve 21 remaining open. Spring 40 will again be compressed by member 34 being moved upwardly by the action of cam surfaces 35 and 36. When the operator's hand is released from the handle, the handle will snap back to its central position under the action of spring 40.

A bleeder valve 41 is associated with chamber 16 so that air can be removed from the system when filling it with liquid or at any other time.

The casing member 14 contains a second master cylinder device, cylinder 42 of which communicates with conduit 8 leading from the master cylinder device 6, the connection being made by a closure plug 43 for the cylinder. The upper end of the cylinder is provided with an outlet 44 which is connected to the previously referred to conduit 8' connected to chamber 16. Within the cylinder is a piston 45 having a sealing cup 46. The rear end of this piston is formed to receive the upper end of the rotatable and axially movable member 34 previously referred to in order to form a bearing for this member and also a connection between it and the piston. The piston is normally held in retracted position by a spring 47 wherein it abuts member 34. The inlet port in plug 43 has associated therewith a valve element 48 carried by piston 45. This valve element is so mounted on the piston that when the piston is in its retracted position, the valve element will be unseated but when the piston is initially moved forwardly, the valve element will assume a seated position. The piston is permitted to have relative movement with the valve element after the valve element is seated. A spring 49 is interposed between the valve element and the piston and normally holds the valve element biased against a cap 50 through which it projects. When the piston moves relatively to the valve element after closing it, spring 49 will be compressed. A bleeder valve 51 is provided for the chamber of the cylinder ahead of the piston in order that air can be removed when the system is being filled with liquid or at any other time.

Whenever handle 37 is swung in either direction from its central position, member 34 will be moved axially as already noted. This axial movement will cause movement of piston 45 and closing of valve 48 to prevent fluid from being forced out into conduit 8. The valve element 48 will be closed at approximately the same time as the controlled shut-off valves are permitted to become closed, said valve closings occurring when the lever is moved only a part of the distance toward either end of slot 39. As handle 37 continues to be moved to an end of the slot, the piston 45 will also continue to be moved and will develop hydraulic pressure which will be transmitted through conduit 8', into chamber 16, and then either conduit 11 or 12 depending upon which direction the handle is moved to leave either shut-off valve 21 or 22 open. Thus the driving wheel brakes will be selectively actuated solely by the manipulation of handle 37. Therefore, it is not necessary to operate the master cylinder device 6 in order to employ the brakes to assist in steering.

It is also to be noted that handle 37 can be employed to actuate piston 45 and cause hydraulic pressure to be developed to operate all the brakes. This is accomplished by pulling down on handle 37. The handle will then fulcrum on the lower edge of slot 39 and member 34 will be moved axially without any rotation. This axial movement causes closing of valve 48 and the development of pressure by piston 45. The central part of the lower edge of the slot is rounded as indicated at 52 in order to permit free rocking of the handle and also easy sliding of the handle on the edge of the slot as member 34 is moved axially. The handle is also provided with cut away portions 53 and 54 in order that it may be freely rocked on its trunnions.

It is to be noted that in the event the limited extent of movement of piston 45 is insufficient to develop the desired pressure, the master cylinder device 6 can always be operated at any time to supplement this pressure as valve 48 will become unseated whenever the pressure developed by the master cylinder 6 is greater than that being developed by piston 45.

From the foregoing description of the system, it is seen that all the brakes may be applied by operation of the master cylinder 6 and the driving wheel brakes on opposite sides of the vehicle may be selectively applied solely by the manipulation of the single handle or lever. This is accomplished by merely moving the handle in one direction or the other from a central predetermined position. The arrangement is also such that the handle can be employed to operate all the brakes or to hold all the brakes applied if the brakes have been previously applied by operation of the master cylinder 6. Thus when the master cylinder 6 has been operated to apply all the brakes, a rotative movement of handle 37 to either end of slot 39 will cause closing of valve 48 and the trapping of fluid under pressure in all the fluid motors. To hold the brakes applied it is thus not necessary to continue to operate the master cylinder 6 as it can be released without releasing the brakes as long as handle 37 is held at either end of the slot. Whenever the hand of the operator is removed from the handle, the parts will automatically assume their inoperative positions shown in Figure 3 due to the action of spring 40 and the arrangement of cam surfaces 35 and 36. A latch 37' (Figure 2) is provided to hold the handle at one end of the slot if such should ever be desirable. This permits the brakes to be maintained applied, if previously applied by the master cylinder 6, and allows the operator to leave the vehicle parked with the brakes applied.

Referring now to Figure 6, I have shown a braking system similar to that of Figure 1 but having embodied therein a power means for developing the fluid pressure which operates the brakes, said power means being controllable by either the foot-operated master cylinder 6 or the master cylinder of the combined master cylinder and selector valve mechanism 9. In the schematic view the driving members 3' and 4' on opposite sides of the vehicle are shown as tracks instead of wheels. The vehicle is provided with the dirigible wheels 1 and 2 and all the parts of the braking system which are the same as those of Figure 1 are indicated by the same reference characters, said parts comprising the master cylinder 6, the combined master cylinder and selector valve mechanism 9, and conduits 8, 10, 11, and 12. The conduit 8' of the system of Figure 1 is eliminated and the port 44 is connected by a conduit 55 with a vacuum-operated hydraulic pressure developing means generally indicated by the reference character 56. This means has a master cylinder 57, the outlet of which is connected by a conduit 58 to chamber 16 at the bottom of the combined master cylinder and selector valve mechanism 9. The master cylinder 57 is operated by a vacuum power cylinder 59 which is connected by conduits 60 and 61 to a source of vacuum such as the manifold 62 of engine 63. Interposed between conduits 60 and 61 is a control valve 64 comprising an inlet valve element 65 and an exhaust valve element 66, both of which are controlled by a floating lever 67.

The means for actuating the control valve comprises a piston 68 reciprocable in a cylinder 69. This piston is connected into conduit 55 in order to be operated by fluid pressure developed by the master cylinder 6 or the master cylinder in the combined master cylinder and selector valve mechanism 9.

The power operated hydraulic pressure producing means described is of known construction. When associated with the braking system in the manner shown, the hydraulic pressure developed by either the master cylinder 6 or the master cylinder in the combined master cylinder and selector valve mechanism 9 will cause the piston of the master cylinder 57 to be operated and to begin to develop pressure to actuate the brakes. Simultaneously therewith the control valve 64 will be so operated that the exhaust valve will be closed and the inlet valve opened so that the vacuum power cylinder 59 will be operated. When this power cylinder is operated, it will act in conjunction with the hydraulic developed pressure to actuate the master cylinder 57. Thus it is seen that this master cylinder 57 is operated by both hydraulic pressure and a power means in the form of a vacuum-operated power cylinder. The advantage of this is to boost the hydraulic pressure which is manually developed by either the master cylinder 6 or the master cylinder in the combined master cylinder and selector valve mechanism 9.

If the master cylinder 6 should be operated by the foot pedal, all the brakes will be applied since all the shut-off valves are open. If handle 37 should be turned in either direction, a brake of a driving member will be selected and applied. If handle 37 should be rocked when in its central position, all the brakes will be applied. Thus it is seen that the system is operated in the same manner as the system in Figure 1. The only difference is that there is means provided for boosting the manually-developed hydraulic pressure in order that the brakes may be applied with greater force for a given manual effort.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, two fluid actuating motors, a single master cylinder device, conduit means leading to each motor, means for developing hydraulic pressure in the conduit means and motors by operation of the master cylinder, two normally open shut-off valves associated with the conduit means each of which is capable of preventing operation of a motor, means for selectively closing the shut-off valves, and means controlled by the movement of a single member only for operating the last named means and for operating the master cylinder device after a selected shut-off valve is closed or for operating the master cylinder device without closing either shut-off valve.

2. In a fluid pressure system, two fluid actuating motors, a master cylinder device, conduit means leading to each motor, means for developing hydraulic pressure in the conduit means and motors by operation of the master cylinder, two shut-off valves associated with the conduit means each of which is capable of preventing operation of a motor, means comprising a lever for selectively closing the shut-off valves, means operable by the lever after a valve is closed for operating the master cylinder device, and means including a fulcrum about which said lever pivots to operate the master cylinder device without closing either shut-off valve.

3. In a fluid pressure system, two fluid actuating motors, a single master cylinder device, conduit means leading to each motor, means for developing hydraulic pressure in the conduit means and motors by operation of the master cylinder, two normally open shut-off valves associated with the conduit means each of which is capable of preventing operation of a motor, means for selectively closing the shut-off valves and comprising rotatable cam means and a lever movable in one direction from a predetermined position for closing one valve and in another direction from the predetermined position for closing the other valve, and means controlled by a continued movement of said lever in the same direction for operating the master cylinder device to produce pressure after either valve is closed.

4. In a fluid pressure system, two fluid actuating motors, a master cylinder device, conduit means leading to each motor, means for developing hydraulic pressure in the conduit means and motors by operation of the master cylinder, two shut-off valves associated with the conduit means each of which selectively operates one of said motors, means for selectively closing the shut-off valves and comprising a manually operable lever movable in one direction from a predetermined position for closing one valve and in another direction from the predetermined position for closing the other valve, means controlled by continued movement of said lever for operating the master cylinder device after either valve is closed, means for returning said lever to its normally inoperative position when released, and fulcrum means about which said lever is rockable to enable said lever when said valves are closed to operate other valve means to simultaneously operate each of said motors.

5. In a fluid pressure system, three fluid actuating motors, a master cylinder device, conduit means leading to each motor, means for developing hydraulic pressure in the conduit means and motors by operation of the master cylinder, three shut-off valves associated with the conduit means each of which is capable of preventing operation of a motor, means comprising a lever for so controlling the closing of the shut-off valves that one valve together with either one of the other two valves can be selectively placed in closed position, and means operable by the lever after it has closed two of the valves for operating the master cylinder device.

6. In a fluid pressure system, three fluid actuating motors, a master cylinder device, conduit means leading to each motor, means for developing hydraulic pressure in the conduit means and motors by operation of the master cylinder, three shut-off valves associated with the conduit means each of which is capable of preventing operation of a motor, means comprising a lever for so controlling the closing of the shut-off valves that one valve together with either one of the other two valves can be selectively placed in closed position, means operable by the lever after it has closed two of the valves for operating the master cylinder device, and means including a fulcrum about which said lever rocks to operate the master cylinder device without closing any shut-off valve.

7. In a fluid pressure actuating system, three fluid actuating motors, a hydraulic pressure developing means, conduit means leading to each motor, three normally open shut-off valves associated with the conduit means each of which is capable of preventing operation of a motor, means for developing hydraulic pressure in the conduit means and motors by operation of the pressure developing means, means comprising a single manually operable member for so controlling the closing of the shut-off valves that one valve together with either one of the other two valves can be selectively placed in closed position, means comprising a master cylinder device for causing hydraulic pressure to be developed in the conduit means leading to each motor, a valve for preventing communication from the master cylinder to the hydraulic pressure developing means, and means for closing the last named valve and operating the master cylinder by the single manually operable member.

8. In a fluid pressure actuating system, three fluid actuating motors, a master cylinder device, conduit means leading to each motor, three normally open shut-off valves associated with the conduit means each of which is capable of preventing operation of a motor, means for developing hydraulic pressure in the conduit means and motors by operation of the master cylinder device, means comprising a single manually operable member for so controlling the closing of the shut-off valves that one valve together with either one of the other two valves can be selectively placed in closed position, means comprising a second master cylinder device for causing hydraulic pressure to be developed in the conduit means leading to each motor, and means for operating the second master cylinder device by the single manually operable means after it has closed two valves controlled thereby.

9. In a fluid pressure actuating system, two fluid actuating motors, a master cylinder device, conduit means leading to each motor, two normally open shut-off valves associated with the conduit means each of which is capable of preventing operation of a motor, means for developing hydraulic pressure in the conduit means and motors by operation of the master cylinder device, means comprising a lever for selectively closing the shut-off valves, means comprising a second master cylinder device for causing hydraulic pressure to be developed in the conduit means leading to each motor, a valve for preventing communication from the master cylinder to the hydraulic pressure developing means, and means for closing the last named valve and operating the second master cylinder by the lever so that a selected motor can be actuated by said second master cylinder independently of operation of the first master cylinder.

10. In a fluid pressure actuating system, two fluid actuating motors, a master cylinder device, conduit means leading to each motor, two normally open shut-off valves associated with the conduit means each of which is capable of preventing operation of a motor, means for developing hydraulic pressure in the conduit means and motors by operation of the master cylinder device, means comprising a lever for selectively closing the shut-off valves, means comprising a second master cylinder device for causing hydraulic pressure to be developed in the conduit means leading to each motor, a normally unseated check valve for preventing communication from the master cylinder to the hydraulic pressure developing means, means for closing the check valve and operating the second master cylinder by the lever so that a selected motor can be actuated by said second master cylinder independently of operation of the first master cylinder, and means for holding the lever in a position where the check valve is maintained seated.

11. In a fluid pressure actuating system, two fluid actuating motors, a master cylinder device, conduit means leading to each motor, two normally open shut-off valves associated with the conduit means each of which is capable of preventing operation of a motor, means for developing hydraulic pressure in the conduit means and motors by operation of the master cylinder device, means comprising a manually operable lever for selectively closing the shut-off valves, means comprising a second master cylinder device for causing hydraulic pressure to be developed in the conduit means leading to each motor, and means for operating the second master cylinder device by the lever after it has closed either shut-off valve or for operating the second master cylinder by the lever without closing a shut-off valve.

12. In a fluid pressure system for a vehicle having driving members for each side thereof, brakes for the members, fluid motors for the brakes, a master cylinder device, conduit means connected to each motor, means for transmitting hydraulic pressure through the conduit means when the master cylinder is operated, two normally open shut-off valves for the conduit means each of which selectively operates one of said motors, means comprising a member movable in opposite directions from a central position for selectively closing the shut-off valves, means for operating the master cylinder by said member when continued to be moved beyond the position where a shut-off valve is closed, and fulcrum means about which said lever is rockable to enable said lever when said valves are closed to operate other valve means to simultaneously operate each of said motors.

13. In a fluid pressure system for a vehicle having driving members for each side thereof, brakes for the members, fluid motors for the brakes, a master cylinder device, conduit means connected to each motor, means for transmitting hydraulic pressure through the conduit means when the master cylinder is operated, two normally open shut-off valves for the conduit means each of which when closed is capable of preventing operation of a motor, means comprising a member movable in opposite directions from a central position for selectively closing the shut-off valves, and means for operating the master cylinder by said member when continued to be moved beyond the position where a shut-off valve is closed for operating only the master cylinder device by said member when moved in another direction.

14. In a fluid pressure system for a vehicle having driving members for each side thereof, brakes for the members, fluid motors for the brakes, a master cylinder device, conduit means connected to each motor, means for transmitting hydraulic pressure through the conduit means when the master cylinder is operated, two shut-off valves for the conduit means each of which is capable of preventing operation of a motor, cam means movable in opposite directions from a central position for selectively closing the shut-off valves, a rotatable member connected to the cam means and mounted for axial movement, means for moving said member axially when it is rotated to rotate the cam means in said opposite directions, means for rotating said member, and means for operating the master cylinder device by the axial movement of the member.

15. In a fluid pressure system for a vehicle having driving members for each side thereof, brakes for the members, fluid motors for the brakes, a master cylinder device, conduit means connected to each motor, means for transmitting hydraulic pressure through the conduit means when the master cylinder is operated, two shut-off valves for the conduit means each of which is capable of preventing operation of a motor, cam means movable in opposite directions from a central position for selectively closing the shut-off valves, a rotatable member connected to the cam means and mounted for axial movement relative to the cam means, means for moving said member axially when it is rotated to rotate the cam means in said opposite directions, a lever pivotally connected to the member for rotating said member or for moving it axially without rotation thereof, and means for operating the master cylinder device by the axial movement of the member.

16. In a fluid pressure brake actuating system for a vehicle having a driving member for each side thereof and a dirigible wheel, brakes for the members and wheel, a fluid motor for each brake, a source of developed hydraulic pressure, conduit means leading to each motor, means operable by developed hydraulic pressure for forcing liquid under pressure through the conduit means to each motor, normally open shut-off valves associated with the conduit means each of which is capable of preventing operation of a motor, means for controlling the closing of said valves so that the motors of the brakes on the driving members only may be selectively operated, means comprising a single master cylinder device connected to also cause liquid under pressure to be forced through the conduit means to the motors independently of fluid pressure from said source, and means including a common operated member for operating the means for controlling the closing of the shut-off valves in a selective manner and subsequently operating the master cylinder to produce pressure.

17. In a fluid pressure brake actuating system for a vehicle having a driving member for each side thereof and a dirigible wheel, brakes for the members and wheel, a fluid motor for each brake, a source of developed hydraulic pressure, conduit means leading to each motor, means operable by developed hydraulic pressure for forcing liquid under pressure through the conduit means to each motor, shut-off valves associated with the conduit means each of which is capable of preventing operation of a motor, means for controlling the closing of said valves so that the motors of the brakes on the driving members only may be selectively operated, means comprising a master cylinder device connected to also cause liquid under pressure to be forced through the conduit means to the motors, means including a common operated member for operating the means for controlling the closing of the shut-off valves in a selective manner and subsequently operating the master cylinder or for operating the master cylinder device independently of the closing of any shut-off valve to cause operation of all the motors.

18. In a fluid pressure brake actuating system for a vehicle having a driving member for each side thereof and a dirigible wheel, brakes for the members and wheel, means for actuating all the brakes including a force developing device, means associated with the actuating means for selectively permitting the actuation of the brakes of the driving members only, a single member for controlling said last named means, and means operable by the single member after it has been operated to select a driving member brake and by a continued movement thereof for actuating said selected brake independently of operation of the force developing device.

19. In a fluid pressure system for a vehicle having driving members for each side thereof, brakes for the members, fluid motors for the brakes, two hydraulic pressure developing means each of which is connected to actuate the brakes, means for selectively causing one brake only to be actuated, a movable member for controlling said selection, and means operable by continued movement of said member after a selection by predetermined movements thereof is made to cause operation of one of the hydraulic pressure producing means to produce pressure so that the brake on either selected driving member can be actuated independently of the operation of the other hydraulic pressure producing means.

20. In a fluid pressure system for a vehicle having a driving member for each side thereof, brakes for the members, fluid motors for the brakes, a master cylinder, conduit means between the master cylinder and each motor, shut-off valves for the conduit means each of which is capable of preventing operation of a motor, a power cylinder for operating the master cylinder, a source of fluid pressure different from atmospheric pressure connected to operate the power cylinder, a control valve for the source, means comprising two other master cylinders each of which is capable of controlling the control valve, and means comprising a single control member for selectively closing a shut-off valve and then subsequently operating one of the last two named master cylinders to cause the power cylinder to operate the first named master cylinder.

WERNER F. BOLDT.